United States Patent [19]

Mandler

[11] 4,147,417
[45] Apr. 3, 1979

[54] OPTICAL SENSING SYSTEM FOR FOCUSING A REFLEX CAMERA

[75] Inventor: Walter Mandler, Midland, Canada

[73] Assignee: Ernst Leitz Wetzlar GmbH, Wetzlar, Fed. Rep. of Germany

[21] Appl. No.: 775,791

[22] Filed: Mar. 9, 1977

[30] Foreign Application Priority Data

Mar. 10, 1976 [DE] Fed. Rep. of Germany ....... 2609877

[51] Int. Cl.² .............................................. G03B 7/08
[52] U.S. Cl. ...................................... 354/25; 354/31; 354/56
[58] Field of Search ................ 354/25, 152, 195, 198, 354/31, 56; 250/201, 204, 578, 234; 356/4; 352/140

[56] References Cited

U.S. PATENT DOCUMENTS 3,762,294  10/1973  Kosaka et al. .......................... 354/25
3,860,935  1/1975  Stauffer ................................. 354/25

FOREIGN PATENT DOCUMENTS 1263325  3/1968  Fed. Rep. of Germany.

Primary Examiner—Michael L. Gellner
Attorney, Agent, or Firm—Bacon & Thomas

[57] ABSTRACT

Disclosed is an optical sensing system for use in focusing the objective of a reflex camera in which light from the exit pupil of the camera objective is projected onto a pair of spaced sensors such that each sensor receives light from a different portion of the exit pupil. Each sensor thus generates a signal which is a function of the light projected from its respective region of the exit pupil, the relative equality of which gives an indication of the correctness of the focus. This feature is achieved by positioning a fully reflecting projection mirror on the back side of a reflex mirror which is positioned behind the camera objective at an angle thereto and has a central region of partial reflectivity. The projection mirror projects the exit pupil of the objective onto an auxiliary plane, located above the reflecting surface of the reflecting mirror when the sensing system is in its normal viewing position, in which two auxiliary objectives are arranged side-by-side, each of which projects light from a different section of the exit pupil onto different sensors.

16 Claims, 5 Drawing Figures

OPTICAL SENSING SYSTEM FOR FOCUSING A REFLEX CAMERA

BACKGROUND OF THE INVENTION

1. Field of the Invention

The present invention relates to optical sensing systems for still cameras, and more particularly, to a sensing system with photoelectric sensors which are arranged in a strip pattern and are responsive to sharpness of focus of the objective in a reflex camera.

2. Description of the Prior Art

It is known that the objective of a photographic camera can be focused automatically by projecting an image of the sighted object at two different aperture angles onto each of two photoelectric receptors or sensors, which are arranged in a strip pattern.

From German Patent No. 1,263,325 it is further known that the light output of the sensors can be converted into a measure of the sharpness of focus of the camera objective. The signal obtained in this manner can either be fed to an adjustment motor which will reset the objective until sharp focus is achieved, (automatic focusing), or it can be fed to an indicating device which gives a reading of the focusing condition. In the latter case, the objective must be moved by hand in order to obtain a sharply focused setting (semi-automatic adjustment).

SUMMARY OF THE INVENTION

In connection with the application of the aforementioned focusing principle to a reflex camera, it is an object of the present invention to provide an arrangement by means of which a portion of the light received through the view finder of the camera is branched off and projected to the sensors in such a way that each sensor receives light only from one half of the exit pupil of the camera objective.

A further object of the invention is the provision of such an arrangement having dimensions which fit approximately into the available space of a reflex camera.

Yet another object resides in the provision of such an arrangement which exhibits a stable setting which will not become unstable as a result of other movable elements in the camera.

Another object resides in providing a camera embodying such an arrangement.

In accomplishing the foregoing objects, there has been provided in accordance with the present invention an optical sensing system suitable for indicating the sharpness of focus of the objective of a reflex camera upon an object being sighted, comprising: a reflex mirror positioned behind the objective and having in its central region an area of partial reflectivity; a fully reflective mirror element positioned on the back side of the reflex mirror in the area of partial reflectivity, whereby an image of the exit pupil of the camera objective is projected onto an auxiliary plane; a pair of spaced auxiliary objectives located in the auxiliary plane; and a pair of photoelectric sensors spaced from the auxiliary objectives opposite from the mirrors and the centers of the sensors being spaced apart from one another a distance equal to the spacing of the auxiliary objectives, whereby light from a different part of the exit pupil is projected by each of the auxiliary objectives onto each respective sensor. Preferably, the sensors are each divided up into strip-like elements, and they are located in the plane upon which the conjugate image of the object sighted by the camera objective (i.e., after being reflected) is projected by the auxiliary objectives. Also provided according to the invention is a reflex camera embodying the foregoing sensing system.

Further special features, objects and advantages of the invention will become apparent from the description following below, when taken together with the accompanying drawings, which illustrate, by way of example, a preferred embodiment of the invention.

DETAILED DESCRIPTION OF PREFERRED EMBODIMENTS

Figure 1A:
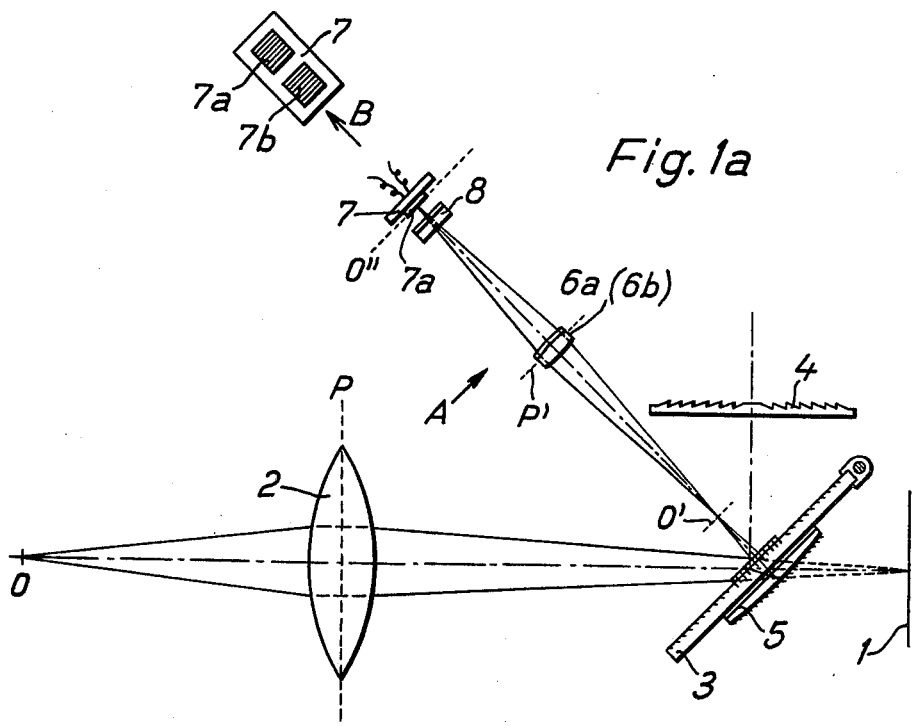
FIG. 1a shows schematically the optical arrangement of the invention, in an expanded light path, as seen from the side.

The present invention provides an optical sensing system which includes in the camera a reflex mirror having a central region covered with a partial mirror coating (known per se), and against the back wall of which is placed a fully reflecting projecting mirror which projects the exit pupil of the camera objective onto an auxiliary plane, located above the reflecting surface of the reflecting mirror when the sensing system is in its normal viewing position, in which two auxiliary objectives are arranged side-by-side at a distance from each other which corresponds to the center distance of the two sensors, whereby each of the two auxiliary objectives projects light from a different section of the exit pupil onto one of the two sensors.

Accordingly, each one of the two sensors receives light from a different aperture region of the exit pupil of the camera objective, preferably from pupil sections which are located diametrically opposite each other. It follows that the two images of the object, which are projected onto the two sensors, will produce identical responses on corresponding strips of both sensors only when these strips are identically impinged, i.e., when the camera objective has a setting of maximum sharpness of focus. In the absence of the latter, two different images of unequal brightness are projected onto these corresponding sensor strips, thereby producing an indication of the deviation of the existing setting from a sharply focused setting. The evaluation and interpretation of the readings obtained from the sensors can be accomplished, for example, in the manner described in German Patent No. 1,263,325.

In a preferred embodiment of the invention, the fully reflecting projecting mirror is bonded to the reflex mirror at a slight angle, so that the optical axis of the light reflected by the projecting mirror is perpendicular to the mirror surface of the reflex mirror. The purpose of this particular configuration is to prevent interfering light from entering the focusing light path or the viewfinder light path, as a result of multiple reflections between the partial-mirror surface region of the reflex mirror and the fully reflecting surface of the projecting mirror.

Reflection on the partial-mirror surface of the reflex mirror of the light coming from the fully reflecting mirror surface of the projecting mirror also produces a loss of light in the focusing light path. In order to prevent this loss of light, the coating on the partial-mirror surface may be such that its reflection characteristics are dependent upon the angle of incidence of the arriving light. In connection with the inclination of the projecting mirror, it is therefore further suggested that the coating selected for this purpose be a dielectric coating, the degree of reflection of which is reduced to a minimum for perpendicularly arriving light.

Another measure for the prevention of loss of light in the focusing light path consists in providing a polarizing coating on the partial-mirror surface of the reflex mirror and in arranging behind it an element which rotates the direction of polarization of the light passing through it. This polarization direction rotating element may be arranged between the reflex mirror and the projecting mirror, and it may, for instance be a λ/8-plate. The polarization direction of the light, after passing twice through the λ/8-plate, is rotated by 90 degrees, so that it corresponds to the pass direction of the partial-mirror surface. On the other hand, it is also possible to combine the polarization direction rotating element with the mirror surface of the projecting mirror.

The projecting mirror has as its purpose to project an image of the exit pupil of the camera objective in an accessible place. Since the light impingement on the strip pattern sensors is important only with respect to the light distribution in the direction perpendicular to the strip pattern, only the formation of lines parallel to the strip pattern is necessary, rather than a good formation of actual image points. For this reason, the fully coated mirror surface of the projecting mirror may be either a spherical surface or a cylindrical surface. Through computations, it has been determined, however, that better results are obtainable with a spherical surface.

Referring now to the drawings, in FIG. 1a are shown schematically those elements of a reflex camera which directly effect the operation of the novel device of the invention. The film plane 1 is arranged behind and in alignment with the camera objective 2. Between the film plane 1 and the objective 2 is positioned a pivotable reflex mirror 3, and above the latter is arranged an adjustment disc 4. The reflex mirror 3 has a central region in which its mirror coating acts only as a partial mirror, so that a portion of the light coming from the camera objective 2 passes through the reflex mirror 3.

To the back side of the reflex mirror 3 is bonded a projecting mirror 5 with a fully reflecting mirror coating, the mirror surface of which is either spherical or cylindrical in shape. This projecting mirror 5 is slightly inclined with respect to the reflex mirror 3, so that the center axis of the light reflected by it is perpendicular to the reflecting surface of the reflex mirror 3.

Figure 4:
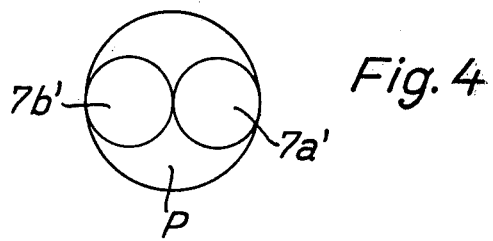
FIG. 4 indicates schematically the location of the exit pupil sections of the camera objective, the light of which is being used in the focus setting measurement.

By means of the camera objective 2 and the projecting mirror 5 an image of the object O is projected onto the conjugate image plane O', while, at the same time, the projecting mirror 5 projects an image of the exit pupil P of the objective 2 onto the plane P' which is located above the reflecting surface of the reflecting mirror when the sensing system is in its normal viewing position. In this plane P' are arranged, side-by-side, two auxiliary objectives 6a and 6b (see also FIG. 1b) which project the image of the object O from the conjugate image plane O' onto a second conjugate image plane O'. In this second image plane O'' are arranged two strip sensors 7a and 7b, being mounted on a common base plate 7. Onto the two sensors 7a and 7b is thus projected an image of the object O. However, the light which is used for the projection of these images arrives from two different aperture regions 7a' and 7b' of the exit pupil P (FIG. 4) of the camera objective 2. The distance between the optical axes of the auxiliary objectives 6a and 6b is the same as the center distance between the strip sensors 7a and 7b. The resulting signal responses of the strip sensors 7a and 7b, being indicative of the degree of sharpness of focus of the objective 2, can be evaluated and used directly or indirectly for adjustment purposes as suggested, for example, in German Patent No. 1,263,325, the disclosure of which is hereby incorporated by reference.

Since it is necessary for the optical axes of the auxiliary objectives 6a and 6b to be precisely aligned with the centers of the strip sensors 7a and 7b, the device of the invention necessitates an appropriate adjustment capability. This requirement can be satisfied by either making one of the two auxiliary objectives laterally displaceable, or by providing special optical adjustment means for this purpose. In the preferred embodiment, this goal is achieved with a double wedge prism 8 which is displaceable in the axial direction.

In the case of a camera designed for attachment of interchangeable objectives with spring shutters, it is further suggested that, in order to obtain the same response on the strip sensors 7a and 7b with each objective, the diameter of the auxiliary objectives 6a and 6b be adapted to the objective with the smallest initial opening.

Figure 1B:
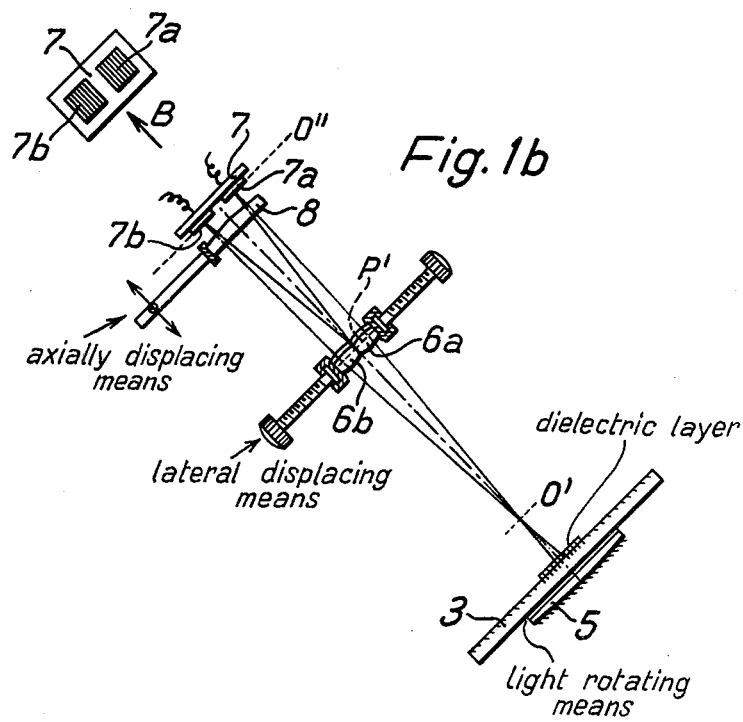
FIG. 1b shows the light path of FIG. 1a, as seen from the top.

In FIGS. 1a and 1b of the drawing is shown the light path of the novel optical arrangement in an expanded representation, for an easier understanding of its operation. FIG. 1b shows a portion of the developed light path of FIG. 1a, as seen in the direction of arrow A. Both figures also show (indicated by arrow B) the strip sensors 7a and 7b in a 90°-rotated position, in order to indicate the orientation of their strip patterns.

In order to accommodate this comparatively long light path inside of a regular camera, it is obviously necessary that this path be angled or folded up. How this can be accomplished in a practical way is shown in FIGS. 2 and 3, which show the actual layout of a reflex camera.

Figure 2:
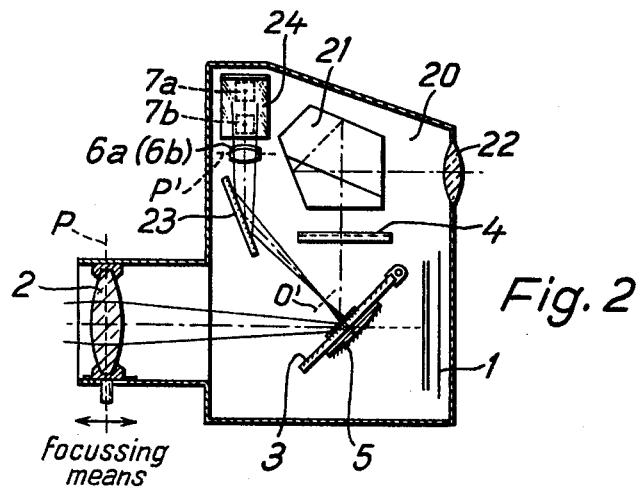
FIG. 2 is a schematic illustration of a reflex camera, using the optical arrangement of the invention.

In FIG. 2, the camera housing is indicated by reference numeral 20, accommodating therein the film plane 1, the camera objective 2, the reflex mirror 3, and the adjustment disc 4. Above the adjustment disc 4 is arranged a penta prism 21, behind which is arranged the occular 22 in a conventional arrangement.

At approximately the same level as the adjustment disc 4 is arranged a mirror 23 which deflects the light coming from the projecting mirror 5 upwardly toward the top of the camera housing 20. At about the level of the penta prism 21, and ahead of the latter, are arranged the two auxiliary objectives 6a and 6b by means of which the light is broken. Above the auxiliary objectives 6a and 6b is arranged a further mirror 24 which deflects the light laterally, in a direction away from the drawing plane of FIG. 4, i.e., to the left in FIG. 3. The final portion of the light path can best be seen in FIG. 3, which represents the camera of FIG. 2 in an elevational view. There, it can be seen that the light coming from the mirror 24 passes through the double wedge prism 8, after which it impinges on the strip sensors 7a and 7b.

Figure 3:
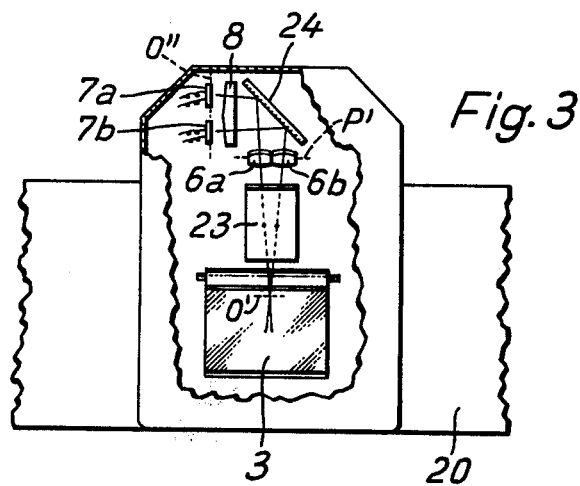
FIG. 3 shows the camera of FIG. 2 in an elevational view.

As FIG. 3 illustrates, the accommodation of the novel optical arrangement requires a somewhat wider dome portion in the camera housing. The unoccupied space of the widened dome portion can be advantageously used to accommodate certain evaluating circuitry and indicating or adjusting components which serve to evaluate the signals received from the strip sensors 7a and 7b.

It should be understood, of course, that the foregoing disclosure describes only a preferred embodiment of the invention and that it is intended to cover all changes and modifications of this example of the invention which fall within the scope of the appended claims.

What is claimed is:

1. An optical sensing system suitable for indicating the sharpness of focus of the objective of a reflex camera upon an object being sighted, comprising:
    (a) a reflex mirror positioned behind the objective and having in its central region an area of partial reflectivity;
    (b) a fully reflective mirror element positioned to the back side of said reflex mirror in the area of partial reflectivity, whereby an image of the exit pupil of the camera objective is projected onto an auxiliary plane located above the reflecting surface of said reflex mirror when said system is in its normal viewing position;
    (c) a pair of spaced auxiliary objectives located in the auxiliary plane; and
    (d) a pair of photoelectric sensors spaced from said auxiliary objectives opposite from said mirrors and the centers of said sensors being spaced apart from one another a distance equal to the spacing of said auxiliary objectives, whereby light from a different part of the exit pupil is projected by each of said auxiliary objectives onto each respective sensor.

2. The optical system as defined by claim 1, wherein said fully reflective mirror is inclined in relation to said reflex mirror in such a way that the optical axis of light reflected by the fully reflective mirror is oriented perpendicular to the surface of the partially reflective area of the reflex mirror.

3. The optical system as defined by claim 1, wherein the degree of reflection of the partially reflective area of the reflex mirror is a function of the angle of incidence of the arriving light.

4. The optical system as defined by claim 3, wherein said partially reflective surface area comprises a dielectric layer having a degree of reflection which is reduced to a minimum for perpendicularly arriving light.

5. The optical system as defined by claim 1, wherein the partially reflective surface area of the reflex mirror comprises light polarizing characteristics, and wherein the system further comprises means arranged behind the partially reflective surface for rotating the direction of polarization of the light passing through the reflex mirror.

6. The optical system as defined by claim 5, wherein said polarization direction rotating means is arranged between the reflex mirror and the fully reflective mirror.

7. The optical system as defined by claim 5, wherein said polarization direction rotating means is combined with the mirror surface of the fully reflective mirror.

8. The optical system as defined by claim 1, wherein the reflecting surface of the fully reflective mirror comprises a spherical surface.

9. The optical system as defined by claim 1, wherein the reflecting surface of the fully reflective mirror comprises a cylindrical surface.

10. The optical system as defined by claim 1, further comprising means for laterally displacing one of the two auxiliary objectives with respect to the optical axis of said one auxiliary objective for purposes of optical adjustment.

11. The optical system as defined in claim 1, further comprising means, arranged between at least one of the two auxiliary objectives and the associated sensor for optically adjusting light passing through the auxiliary objective.

12. The optical system as defined by claim 11, wherein the optical adjustment means comprises a double wedge prism and means for displacing said prism in the axial direction relative to the optical axes of said auxiliary objectives.

13. The optical system as defined by claim 1, wherein each of said sensors comprises an array of sensor strips.

14. The optical system as defined by claim 1, wherein said sensors are located in the plane upon which the conjugate image of the object sighted by the camera objective is projected by said auxiliary objectives.

15. The camera as defined by claim 15, wherein said focussing means comprises an automatic means including a motor.

16. A reflex camera, comprising a housing, an objective lens mounted in said housing, the optical system as defined by claim 1 mounted behind said objective lens inside of said housing, and means associated with said objective lens for focussing said objective lens in response to an indication provided by said optical system.

* * * * *